(12) United States Patent
Greenwood

(10) Patent No.: US 6,584,864 B2
(45) Date of Patent: Jul. 1, 2003

(54) SENSOR

(75) Inventor: John Christopher Greenwood, Loughborough (GB)

(73) Assignee: Druck Limited (GB)

( * ) Notice: Subject to any disclaimer, the term of this patent is extended or adjusted under 35 U.S.C. 154(b) by 0 days.

(21) Appl. No.: 10/183,225

(22) Filed: Jun. 26, 2002

(65) Prior Publication Data

US 2003/0005768 A1 Jan. 9, 2003

(30) Foreign Application Priority Data

Jul. 5, 2001 (GB) .............................................. 116393

(51) Int. Cl.$^7$ ........................... G01L 1/10; G01L 11/00; G01L 9/06; G01P 15/10
(52) U.S. Cl. ................. 73/862.59; 73/514.29; 73/702; 73/727
(58) Field of Search ..................... 73/702, 704, 726, 73/727, 778, 862.59, 514.29

(56) References Cited

U.S. PATENT DOCUMENTS

| | | | | |
|---|---|---|---|---|
| 4,372,173 A | * | 2/1983 | EerNisse et al. .......... | 73/862.59 |
| 4,594,898 A | * | 6/1986 | Kirman et al. ................. | 73/778 |
| 4,970,903 A | * | 11/1990 | Hanson .................... | 73/862.59 |
| 5,136,607 A | | 8/1992 | Morbieu ....................... | 372/92 |
| 5,528,939 A | * | 6/1996 | Martin et al. .................. | 73/702 |
| 5,596,145 A | | 1/1997 | Albert et al. ............ | 73/514.29 |
| 5,844,141 A | * | 12/1998 | Stansfeld ..................... | 73/702 |
| 5,939,635 A | * | 8/1999 | Martin ........................ | 73/702 |
| 5,969,257 A | * | 10/1999 | De Bortoli ................... | 73/702 |

FOREIGN PATENT DOCUMENTS

EP          0 855 583 A2       7/1998      ............. G01L/9/00

OTHER PUBLICATIONS

"Electrostatic–comb Drive of Lateral Polysilicon Resonators", by William C. Tang, Tu–Cuong H. Nguyen, Michael W. Judy, and Roger T. Howe, pp 328, Sensors and Actuators, A21–A23(1990), University of California at Berkley.

"Design of Compliant Microleverage Mechanisms", by Xiao–Ping S. Su and Henry S. Yang, Sensors and Actuators A87, pp 146–156, Department of Mechanical Engineering, Univ. of Calif., Berkeley, CA and Kaiser Aluminum Engineered Products, Lost Angeles, CA, Jul. 17, 2000.

* cited by examiner

Primary Examiner—Daniel S. Larkin
Assistant Examiner—John C. Hanley
(74) Attorney, Agent, or Firm—Young & Basile, P.C.

(57) ABSTRACT

A resonant sensor comprises a support structure comprising two support points; a laminar resonator suspended between said two support points of said support structure and comprising a plurality of substantially parallel flexural members which are responsive to relative movement of said support points; means for exciting said resonator into a balanced mode of oscillation and means for sensing motion of said resonator.

Said means for sensing motion of said resonator is or are spaced from, and linked to, said flexible area of said resonator by means of levers.

Said support points are preferably adapted to move relative to each other in response to a difference in pressure, force or acceleration.

11 Claims, 2 Drawing Sheets

SENSOR

BACKGROUND OF THE INVENTION

The present invention relates to a resonant sensor, in particular to a resonant pressure sensor, in particular to a resonant pressure sensor of the type which is highly accurate and is used for detecting small changes or variations in barometric pressure.

Resonant pressure transducers of the type which comprise a "butterfly"-shaped resonator defined by a boron etch stop have been in manufacture for several years and have demonstrated excellent performance. These sensors are known as "RPT" resonant pressure transducers.

In a paper entitled "A high accuracy resonant pressure sensor by fusion bonding and trench etching" by Welham et al, published at Sensors and Actuators 76 (1999) p298–304, a novel design of pressure sensor based upon an electrostatically driven and piezoresistively sensed "double shuttle" lateral resonator is presented.

The sensor described in that paper is manufactured from a square of silicon, using a trench etching technique. Silicon is a particularly advantageous material to use, since it has a high gauge factor, i.e. it has a high change of resistance with strain. The sensor described in the paper comprises a single crystal silicon resonator, suspended between two pedestals which are an integral part of a diaphragm. The design of the diaphragm is based on the known RPT design, where the pedestals move apart approximately 2 µm at a full scale pressure of 3.5 bar. The "double-shuttle" resonator is formed from two inertial masses and eight flexures. The resonator is excited electrostatically into a balanced mode of oscillation via a pair of comb capacitors. Its motion is sensed via a pair of piezoresistors that couple together each inertial mass. Upon the application of a pressure, the diaphragm deforms, so stressing the resonator and inducing a shift in its resonant frequency.

The structural layer which forms the resonator, conductive tracks and pads is electrically isolated from the diaphragm by an oxide layer. The tracks are curved when bridging across to the resonator to minimise their contribution to the stiffness of the diaphragm. An encapsulation chip is bonded over the resonator to allow operation in vacuum and to protect the resonator from the enviromnent, e.g., dust, corrosive chemicals and condensation.

While the design of sensor described in the paper has a number of advantages over the RPT sensor, it also has a number of disadvantages. In particular, although the strain gauge has a high output compared to the RPT sensor, it is desirable, for particularly demanding applications, to increase this still further. Additionally, heat is generated within the strain gauge and the physical location of the strain gauge close to the centre of the sensor, means that measures have to be taken to ensure adequate heat dissipation. Finally, the design of the sensor requires that electrical connections are provided between stationary and moving parts of the sensor.

It is an object of the present invention to provide a sensor in which the above disadvantages are reduced or substantially obviated.

BRIEF SUMMARY OF THE INVENTION

The present invention provides a resonant sensor which comprises a support structure comprising two support points; a laminar resonator suspended between said two support points of said support structure and comprising a plurality of substantially parallel flexural members which are responsive to relative movement of said support points; means for exciting said resonator into a balanced mode of oscillation and means for sensing motion of said resonator wherein said means for sensing motion of said resonator is or are spaced from, and linked to, said flexible area of said resonator by means of levers.

Said support structure preferably comprises a diaphragm and two pedestals formed integrally with said diaphragm.

Said laminar resonant sensor preferably comprises a structural layer electrically isolated from said diaphragm and comprising a single crystal silicon resonator suspended between said pedestals.

Said means for exciting said resonator preferably comprises means for exciting said resonator electrostatically, more preferably a pair of comb capacitors. In a further preferred embodiment of a resonant sensor according to the present invention said means for sensing motion of said resonator comprises at least one piezoresistor, which piezoresistor is preferably mounted on or adjacent to the outer edge of said sensor.

Said single crystal silicon resonator is preferably substantially rectangular in shape and said flexural members are preferably formed in said central portion of the rectangle, more preferably by the technique of trench etching. Said structural layer is preferably electrically isolated from said diaphragm by an oxide layer.

Said support points are preferably adapted to move relative to each other in response to a difference in pressure, force or acceleration.

In a particularly preferred embodiment of a resonant sensor according to the invention, said support points are adapted to move relative to each other in response to a difference in pressure.

BRIEF DESCRIPTION OF THE DRAWINGS

An embodiment of a resonant pressure sensor will now be described in more detail with reference to the accompanying drawings in which.

DETAILED DESCRIPTION

Figure 1:
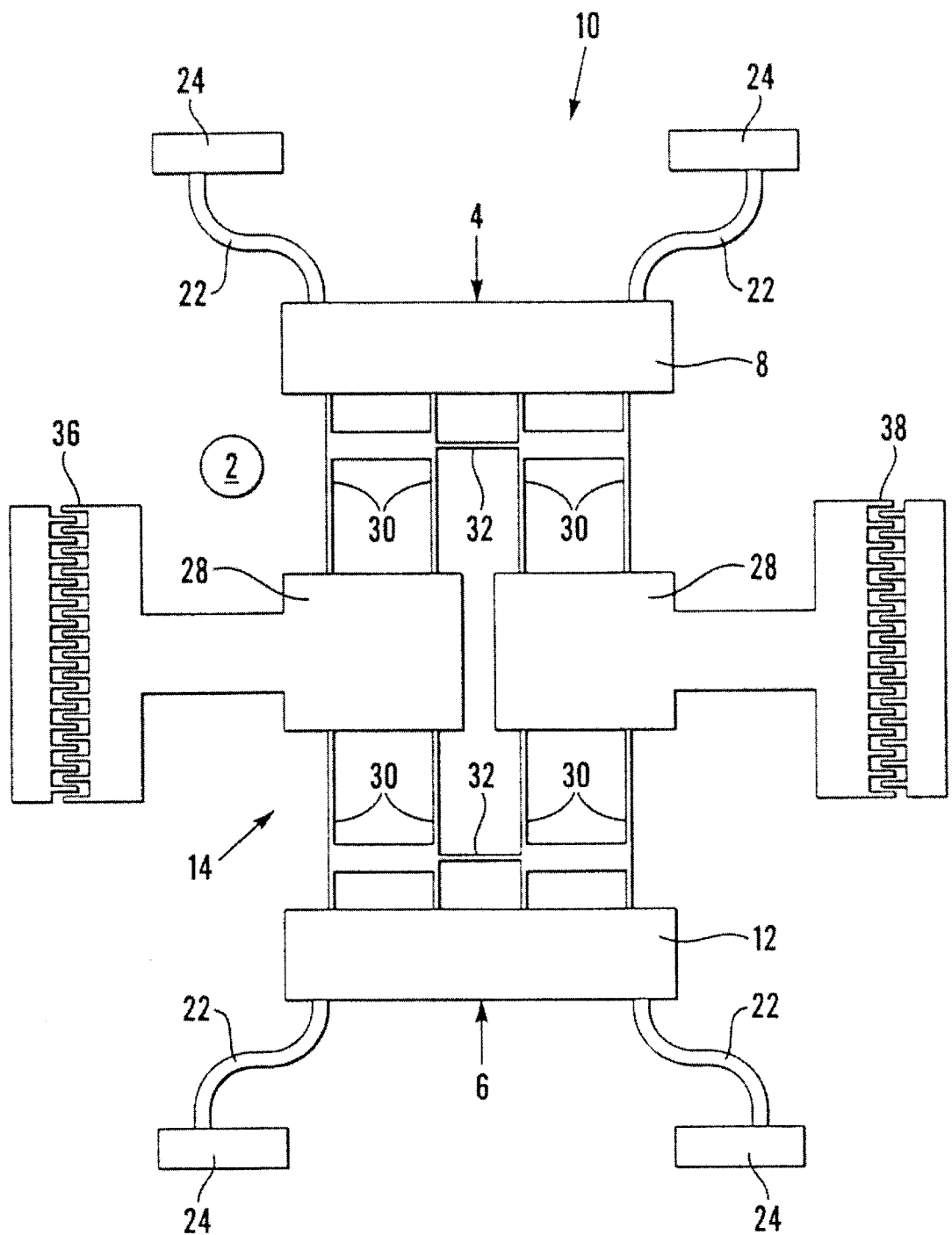
FIG. 1 is a plan view of a resonant pressure sensor of the type described in "A high accuracy resonant pressure sensor by fusion boundary and trench etching" by Welham et al, published at Sensors and Actuators 76 (1999) p298–304

As can be seen from FIG. 1 a resonant pressure sensor shown generally at 10 comprises a diaphragm 2. Two pedestals 4,6 are formed integrally with the diaphragm 2 and project from the surface thereof. The pedestals 4,6 terminate in flat surfaces 8,12 which are substantially parallel to the plane of the diaphragm 2.

A structural layer shown generally at 14 is electrically isolated from the diaphragm 2 by means of an oxide layer and comprises a single crystal silicon resonator, conductive tracks 22 and contact pads 24. The single crystal silicon resonator is suspended between the pedestals 4,6 and is formed from two inertial masses 26,28 and eight flexures 30. The inertial masses 26,28 are coupled together via a pair of piezoresistors 32. The conductive tracks 22 are curved in the region where they form a bridge across the diaphragm, in order to minimise their contribution to the stiffness of the diaphragm 2.

A pair of comb capacitors 36,38 are provided at the free ends of the inertial masses 26,28 so that the resonator can be excited electrostatically into a balanced mode of oscillation.

In operation, the resonator is excited into a balanced mode of operation by applying a signal of the form $+V_p+v_d\sin(\omega t)$ to one drive comb and its inverse $-V_p-v_d\sin(\omega t)$ to the other. The feedthrough from drive signals to the piezoresistive pick-ups will tend to cancel each other, as they are 180° out of phase. To measure the motion of the resonator, the piezoresistive pick-ups are connected as an on-chip Wheatstone bridge by employing the flexures of the resonator, which are of approximately the same resistance as the piezoresistive pick-ups, as passive arms.

Wire bonds connect the sensor to the custom pcb header which is attached to a pcb containing the drive electronics. The Wheatstone bridge is biased with positive and negative voltages. The output signals from the Wheatstone bridge are ac-coupled into an instrumentation amplifier. The amplitude and phase of the amplifier output signal are controlled using automatic gain control and an integrator, before being fed back to the drive combs in order to achieve closed-loop operation.

Figure 2:
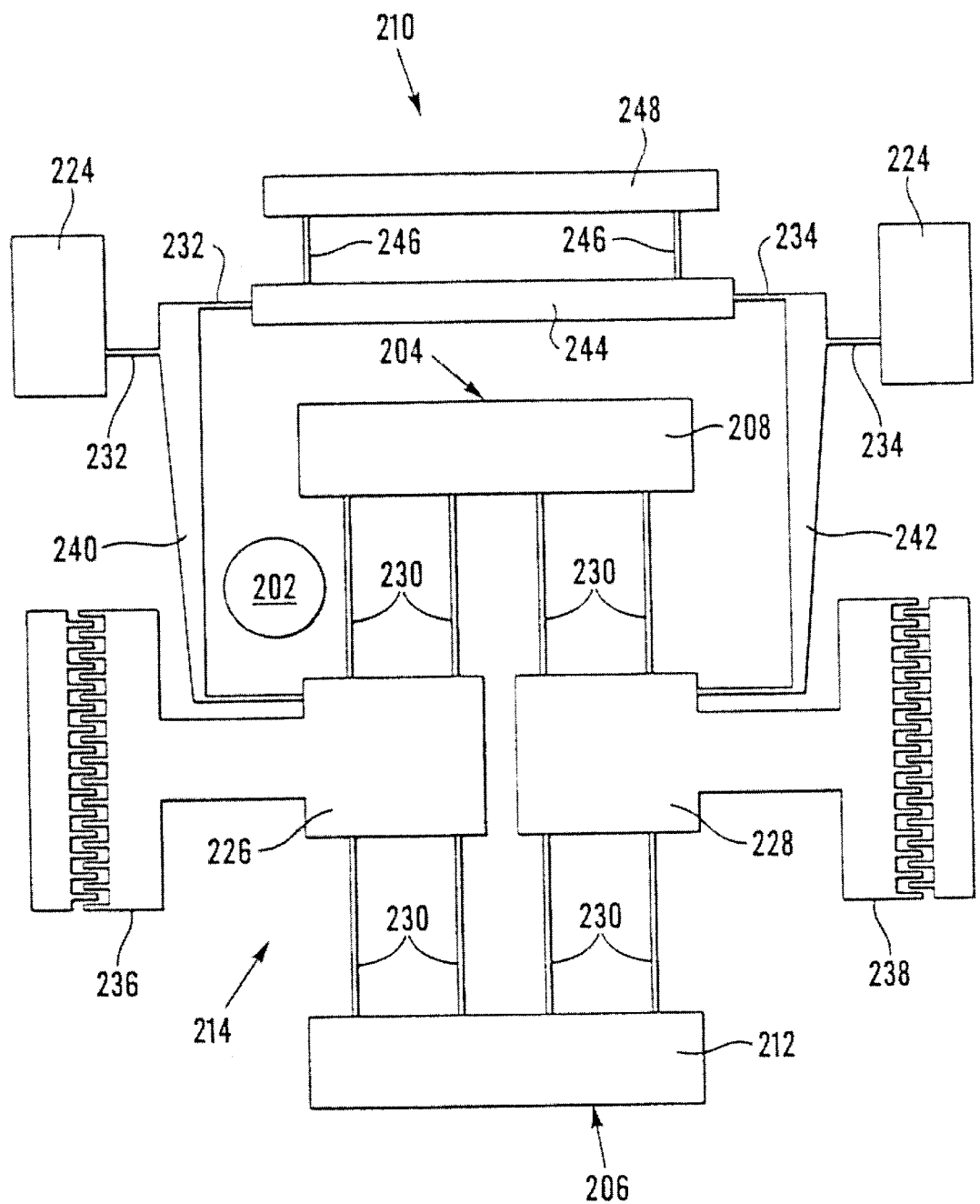
FIG. 2 is a plan view of an embodiment of a resonant pressure sensor according to the present invention.

In the embodiment of a resonant pressure sensor shown generally at 210 in FIG. 2, the sensor 210 comprises a diaphragm 202. Two pedestals 204,206 are formed integrally with the diaphragm 202 and project from the surface thereof. The pedestals 204,206 terminate in flat surfaces 208,212 which are substantially parallel to the plane of the diaphragm 202.

A structural layer shown generally at 214 is electrically isolated from the diaphragm 202 by means of an oxide layer and comprises a single crystal silicon resonator. The single crystal silicon resonator is suspended between the pedestals 204, 206 and is formed from two inertial masses 226,228 and a plurality of flexural members 230. The inertial masses 226,228 are linked via a pair of levers 240,242 to piezoresistors 232,234 at the outer edge of the sensor 210. A connecting linkage 244 connects together the two piezoresistors 232, 234.

The outer ends of the piezoresistors 232,234 are connected to fixed electrical contacts 224. The connecting linkage 244 is connected electrically and guided mechanically by the flexures 246.

When the inertial masses 226,228 move apart, the piezoresistors 232,234 are compressed and the change in resistance is sensed by passing a current from the fixed electrical contact 248 through the flexures 246, the linkage 244 and the piezoresistors 232,234 to the fixed electrical contacts 224.

The electrical contacts 224,248, the linkage 244 and the flexures 246 which form the electrical path which connects to the piezoresistors 232,234 can, with advantage, be doped to reduce the series resistance.

When the two inertial masses 226,228 move in the same direction, for example to the right, the lever 242 will push the linkage 244 via the piezoresistor 234, while on the other side lever 240 will pull the linkage 244 via the piezorsistor 232. The preferred mode of oscillation is where the inertial masses 226,228 move out of phase, in opposite directions and the operation of the linkage 244 ensures that the frequency of this mode is significantly different to the mode in which the inertial masses move in phase, in the same direction. This mechanism also ensures that the outputs of the strain gauges 232, 234 add for the preferred mode of oscillation and cancel for the non-preferred mode.

In operation, the diaphragm 202 is flexed by changes in barometric pressure, and this flexing leads to relative movement between the two pedestals 204,206. As the pedestals move relative to each other, the resonator which is mounted on the flat surfaces 208, 212 of the pedestals 204,206 flexes. The force available from the moving inertial masses 226,228 is amplified by the levers 240, 242 and the amplified force is detected and measured by the piezoresistors 232, 234.

The electrical operation of the resonant pressure sensor of FIG. 2 is similar to that of the known resonant pressure sensor of FIG. 1. The resonator is excited into a balanced mode of operation by applying a signal to each drive comb. To measure the motion of the resonator, a current is passed through the piezoresistive pick-ups which are connected in parallel. The current can come from an external load resistor or an electronic constant current source.

Wire bonds connect the sensor to the custom pcb header which is attached to a pcb containing the drive electronics. The output signals from the piezoresistive pick-ups are ac-coupled into an amplifier. The amplitude and phase of the amplifier output signal are controlled using automatic gain control and an integrator, before being fed back to the drive combs in order to achieve closed-loop operation.

What is claimed is:

1. A resonant sensor comprises a support structure comprising two support points;
   a laminar resonator suspended between said two support points of said support structure and comprising a plurality of substantially parallel flexural members which are responsive to relative movement of said support points;
   means for exciting said resonator into a balanced mode of oscillation and means for sensing motion of said resonator wherein
   said means for sensing motion of said resonator is or are spaced from, and linked to, said flexible area of said resonator by means of levers.

2. A resonant sensor according to claim 1 wherein said laminar resonator is a single crystal silicon resonator.

3. A resonant sensor according to claim 1 wherein said support structure is a diaphragm.

4. A resonant sensor according to claim 1 wherein said support points are adapted to move relative to each other in response to a difference in pressure, force or acceleration.

5. A resonant sensor according to claim 1 wherein said means for exciting said resonator into a balanced mode of oscillation comprises means for exciting said resonator electrostatically.

6. A resonant sensor according to claim 5 wherein said means for exciting said resonator electrostatically into a balanced mode of oscillation comprises a pair of comb capacitors.

7. A resonant sensor according to claim 1 wherein said means for sensing motion of said resonator comprises at least one piezoresistor.

8. A resonant sensor according to claim 7 wherein said piezoresistor is mounted on or adjacent to the outer edge of said sensor.

9. A resonant sensor according to claim 2 wherein said single crystal silicon resonator is substantially rectangular in shape and said flexural members are formed in said central portion of said rectangle.

10. A resonant sensor according to claim 9 wherein said flexural members are formed by the technique of trench etching or deep reactive ion etching.

11. A resonant sensor according to claim 3 wherein said support structure comprises a structural layer which is electrically isolated from said diaphragm by an oxide layer.

* * * * *